US009815237B2

(12) United States Patent
Iuliano et al.

(10) Patent No.: US 9,815,237 B2
(45) Date of Patent: Nov. 14, 2017

(54) SYSTEM FOR ADJUSTING THE LAND CHANNEL LENGTH ON AN EXTRUSION DIE

(71) Applicant: Nordson Corporation, Westlake, OH (US)

(72) Inventors: Salvatore G. Iuliano, Chippewa Falls, WI (US); Michael K. Truscott, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 159 days.

(21) Appl. No.: 14/627,489

(22) Filed: Feb. 20, 2015

(65) Prior Publication Data

US 2016/0243745 A1    Aug. 25, 2016

(51) Int. Cl.
  *B29C 47/16*  (2006.01)
  *B29C 47/12*  (2006.01)
  (Continued)

(52) U.S. Cl.
  CPC ........ *B29C 47/124* (2013.01); *B29C 47/0021* (2013.01); *B29C 47/085* (2013.01);
  (Continued)

(58) Field of Classification Search
  CPC ........... B29C 47/0806; B29C 47/0816; B29C 47/085; B29C 47/124; B29C 47/16; B29C 47/165
  See application file for complete search history.

(56) References Cited

U.S. PATENT DOCUMENTS 2,479,804 A * 8/1949 Bailey et al. ....... B29C 47/0816
                                                         264/176.1
2,963,741 A    12/1960 Longstreth et al.
(Continued)

FOREIGN PATENT DOCUMENTS

DE    9422051 U1    9/1997
EP    0040672 A1    12/1981
(Continued)

OTHER PUBLICATIONS

Unpublished U.S. Appl. No. 14/660,386 entitled "Extrusion Die Tension Adjuster and Method of Using Same" filed Mar. 17, 2015, 34 pages.
(Continued)

*Primary Examiner* — Yogendra Gupta
*Assistant Examiner* — Joseph Leyson
(74) *Attorney, Agent, or Firm* — Baker & Hostetler LLP (57) ABSTRACT

An extrusion die with adjustable land channel can be formed of a die body that includes a first die body portion and a second die body portion, a first lip body, a second lip body, and a land channel body. The extrusion die can have a flow channel that includes a land channel terminating in an outlet orifice. The flow channel may be bound on one side by the first die body portion, the land channel body, and the first lip body. The flow channel may be bound on an opposite side by the second die body portion and the second lip body. In some examples, the length of the land channel is adjustable by configuring the land channel body and/or first lip body to move across the width of the flow channel.

18 Claims, 8 Drawing Sheets

(51) Int. Cl.
  *B29C 47/08*   (2006.01)
  *B29C 47/00*   (2006.01)
  B29C 47/92     (2006.01)
  B29L 7/00      (2006.01)

(52) U.S. Cl.
  CPC ........ *B29C 47/0816* (2013.01); *B29C 47/165* (2013.01); *B29C 47/004* (2013.01); *B29C 47/0806* (2013.01); *B29C 47/92* (2013.01); *B29C 2947/92628* (2013.01); *B29C 2947/92638* (2013.01); *B29C 2947/92647* (2013.01); *B29C 2947/92904* (2013.01); *B29L 2007/00* (2013.01)

(56) References Cited

U.S. PATENT DOCUMENTS

| | | | |
|---|---|---|---|
| 3,382,537 A | 5/1968 | Tigner | |
| 3,813,204 A | 5/1974 | Gregory | |
| 3,829,274 A | 8/1974 | Melead | |
| 4,372,739 A * | 2/1983 | Vetter | B29C 47/0816 264/176.1 |
| 4,533,510 A | 8/1985 | Nissel | |
| 4,594,063 A * | 6/1986 | Reifenhauser et al. | B29C 47/165 264/176.1 |
| 4,753,587 A | 6/1988 | Djordjevic et al. | |
| 4,990,079 A | 2/1991 | Lorenz | |
| 5,273,595 A | 12/1993 | Tomic et al. | |
| 5,639,305 A | 6/1997 | Brown et al. | |
| 5,770,129 A * | 6/1998 | Monti | B29C 47/16 264/40.1 |
| 7,296,991 B2 | 11/2007 | Irwin | |
| 8,777,605 B2 | 7/2014 | Ulcej et al. | |
| 8,858,211 B2 | 10/2014 | Fraley | |
| 2013/0122131 A1 | 5/2013 | Sedivy et al. | |

FOREIGN PATENT DOCUMENTS

| | | |
|---|---|---|
| EP | 0668143 A1 | 8/1995 |
| EP | 1419827 A2 | 5/2004 |
| JP | S5649222 U | 5/1981 |

OTHER PUBLICATIONS

European Application No. 16153200.7: European Search Report dated Jul. 7, 2016, 9 pages.

* cited by examiner

SYSTEM FOR ADJUSTING THE LAND CHANNEL LENGTH ON AN EXTRUSION DIE

TECHNICAL FIELD

This disclosure relates to extrusion dies and, more particularly, to systems and methods for adjusting the land channel length on extrusion dies.

BACKGROUND

An extrusion die is used to extrude molten thermoplastic material into a relatively thin film or sheet. Conventional extrusion dies have a die cavity with the general shape of a coat hanger. These extrusion dies have been generally referred to as coat hanger dies. Typical coat hanger dies include an inlet, an inlet manifold, a generally triangular shaped preland channel, a final land channel, and a die exit or gap. In operation, molten polymer flows through the extrusion die from the inlet to the die exit. The size and shape of the different channels are selected to promote uniform polymer flow across the face of the die and produce a thin sheet or film having a desired thickness.

In practice, sheet manufacturers are often required to produce sheets of different thicknesses to meet various customer demands. For this reason, an extrusion die can have adjustable lip gap spacing. The distance between the lips of the extrusion die can be adjusted by the manufacturer to control the size of the die exit. In turn, this controls the thickness of the sheet exiting the die.

While adjustable lip gap spacing is helpful to provide manufacturers with processing flexibility, other processing challenges can arise when lip gap spacing is widened or narrowed on an extrusion die. The rheological characteristics of the molten polymer flowing through the extrusion die are a function not only of the lip gap spacing at the die exit but also the configuration of the flow pathways leading up to the die exit. For example, flow pathways leading up to the die exit, including the final land channel, are generally sized for a specific die exit size. This ensures good back pressure and flow characteristics through the extrusion die. With adjustable lip gap dies, manufacturers can size the flow pathways to be optimized for the middle die exit size between the smallest and largest adjustable opening sizes. But this compromises processing characteristics when operating at a smaller or larger die exit size, potentially resulting in product orientation and shrinkage issues.

SUMMARY

In general, this disclosure is directed to systems and methods for adjusting the land channel length on extrusion dies. As used herein, the term "land channel" refers to the section of the polymer flow channel within the extrusion die that is immediately before the exit or outlet orifice of the extrusion die in the direction of polymer flow. In some extrusion die designs, this land channel is referred to as the final land channel. The dimensions of the land channel help control the back pressure of the polymer flowing through the extrusion die, which influences the shape of the extrudate and provides control over the dimensional thickness of the extruded sheet.

In general, the desired length of the land channel depends on the thickness of the product being produced. A thicker product can benefit from a longer land channel length, for example with a sheet gauge thickness greater than 0.1 inches (2.5 mm) using a land length greater than 2 inches (51 mm). By contrast, a thinner product can benefit from a shorter land channel length, for example with a sheet gauge thickness less than 0.03 inches (0.75 mm) using a land length less than 0.5 inches (13 mm). Land channel length influences polymer flow uniformity across the die, helping to ensure uniform polymer flow at the die exit.

This disclosure describes systems and methods for adjusting the land channel length on an extrusion die, for example, so that the land channel length can be changed as the thickness of a particular sheet being produced changes. In one configuration, the extrusion die is formed of a pair of die body portions having a corresponding pair of lip body portions connected thereto. The extrusion die provides a polymer flow channel between opposed pairs of the die body portions and the lip body portions. The polymer flow channel extends from an inlet that receives molten polymer to an outlet orifice through which an extruded sheet is discharged. The end portion of the flow channel leading to the outlet orifice forms the land channel of the extrusion die.

To adjust the length of the land channel, the extrusion die includes, in some configurations, one or more movable flow channel wall segments positioned between a die body portion and a lip body portion. The movable flow channel wall segment, which may be referred to as a land channel body, is movable across at least a portion of the width of the flow channel. As a result, the width of the flow channel narrows or widens as the movable flow channel wall segment is advanced into the flow channel or retracted from the flow channel. Initially, the land channel may extend beyond the upstream edge of the movable wall segment such that the movable wall segment bounds a side of the land channel. Advancing the movable wall segment into the flow channel narrows the flow channel, redefining the position of the land channel such that the land channel terminates at the upstream edge (in the direction of polymer flow) of the movable wall segment. In instances where the lip body portion is also movable, the lip body portion can be advanced even farther across the width of the flow channel, narrowing the outlet orifice. This further redefines the position of the land channel such that the land channel terminates at the downstream edge of the movable wall segment. In this manner, the addition of one or more movable flow channel wall segments allows the upstream edge of the land channel to be adjusted, thereby varying the length of the land channel.

As noted above, in some configurations, the extrusion die is configured with movable die lips to provide adjustable lip gap spacing. In operation, an operator can move the die lips of the extrusion die to a desired position based on the thickness of the sheet being produced. The operator can also adjust the length of the land channel in the extrusion die so that the length of the land channel is appropriate for the particular die lip spacing being used. In one configuration, the extrusion die includes an adjustment mechanism operatively connected to both the movable die lips and the one or more movable flow channel wall segments. Engaging the adjustment mechanism causes the die lips to move and the lip gap spacing to change. The engagement mechanism simultaneously changes the length of the land channel as the lip gap spacing is being adjusted. Such a configuration can allow operators to make quick, on-line adjustments to the lip gap spacing of their extrusion die. The simultaneous adjustment of the land channel length regulates the backpressure to provide the correct amount of lip backpressure for the particular lip gap spacing selected. This can eliminate lengthy shutdowns while a processor replaces components of their extrusion die to accommodate a new lip gap spacing.

In one example according to the disclosure, an extrusion die is described that includes a die body, a first lip body, a second lip body, at least one land channel body, and a flow channel that includes a land channel terminating in an outlet orifice. The die body includes a first die body portion having a first flow channel face and a second die body portion having a second flow channel face. The first lip body is connected to the first die body portion and has a first lip face and the second lip body is connected to the second die body portion and has a second lip face. The first lip body and the second lip body form the outlet orifice therebetween. The at least one land channel body has a land channel face positioned between the first flow channel face and the first lip face. In the extrusion die, the flow channel is bounded on one side by at least the first flow channel face, the land channel face, and the first lip face and on an opposite side by at least the second flow channel face and the second lip face. The at least one land channel body is movable so as to adjust a length of the land channel.

In another example, a method of adjusting a length of a land channel using an extrusion die is described. The extrusion die has a flow channel terminating in an outlet orifice, with the flow channel being bound on one side by at least a first die body portion, a land channel body, and a first die lip and being bound on an opposite side by at least a second die body portion and a second die lip. The method involves advancing the first die lip toward the second die lip and thereby adjusting a width of the outlet orifice. The method further involves advancing the land channel body toward at least one of the second die body portion and the second die lip and thereby adjusting the length of the land channel.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the invention in any way. The description provides practical illustrations for implementing certain preferred embodiments of the invention. Examples of constructions, materials, dimensions, and manufacturing processes are provided for selected elements; all other elements employ that which is known to those of ordinary skill in the field of the invention. Those of ordinary skill in the art will recognize that many of the given examples have a variety of suitable alternatives.

This disclosure relates to an extrusion die having a land channel and method for adjusting the length of a land channel. In one embodiment, the extrusion die has a pair of die body portions providing a polymer flow channel therethrough. The die body portions have a corresponding pair of die lips that form an outlet orifice to the polymer flow channel. The terminal portion of the flow channel extending upstream from the outlet orifice forms the land channel of the extrusion die. The length of the land channel is adjustable, for example, as the width of the outlet orifice changes.

To adjust the length of the land channel, in one embodiment, the extrusion die includes a movable land channel body. The movable land channel body in this embodiment forms a segment of the wall bounding the flow channel. The movable land channel body is advanced and retracted across the width of the flow channel to change the length of the land channel. Depending on the position of the movable land channel body, the land channel terminates at the downstream terminal edge of the land channel body, the upstream terminal edge of the land channel body, or beyond the upstream terminal edge of the land channel body. In other embodiments, the extrusion die includes multiple movable land channel bodies to provide additional positions to which the length of the land channel can be set.

Adjusting the length of the land channel can change the backpressure of the molten polymer flow at the outlet orifice. The length of the land channel may be increased as the width of the outlet orifice increases and decreased as the width of the outlet orifice decreases. Increasing the width of the outlet orifice has a tendency to reduce the backpressure at the outlet by reducing the flow restriction at the outlet. Conversely, decreasing the width of the outlet orifice has a tendency to increase the backpressure at the outlet by increasing the flow restriction at the outlet. An extrusion die with adjustable length land channel is useful, for example, so that the length of the land channel can be adjusted to a length appropriate for the particular outlet orifice size selected for use.

Figure 1:
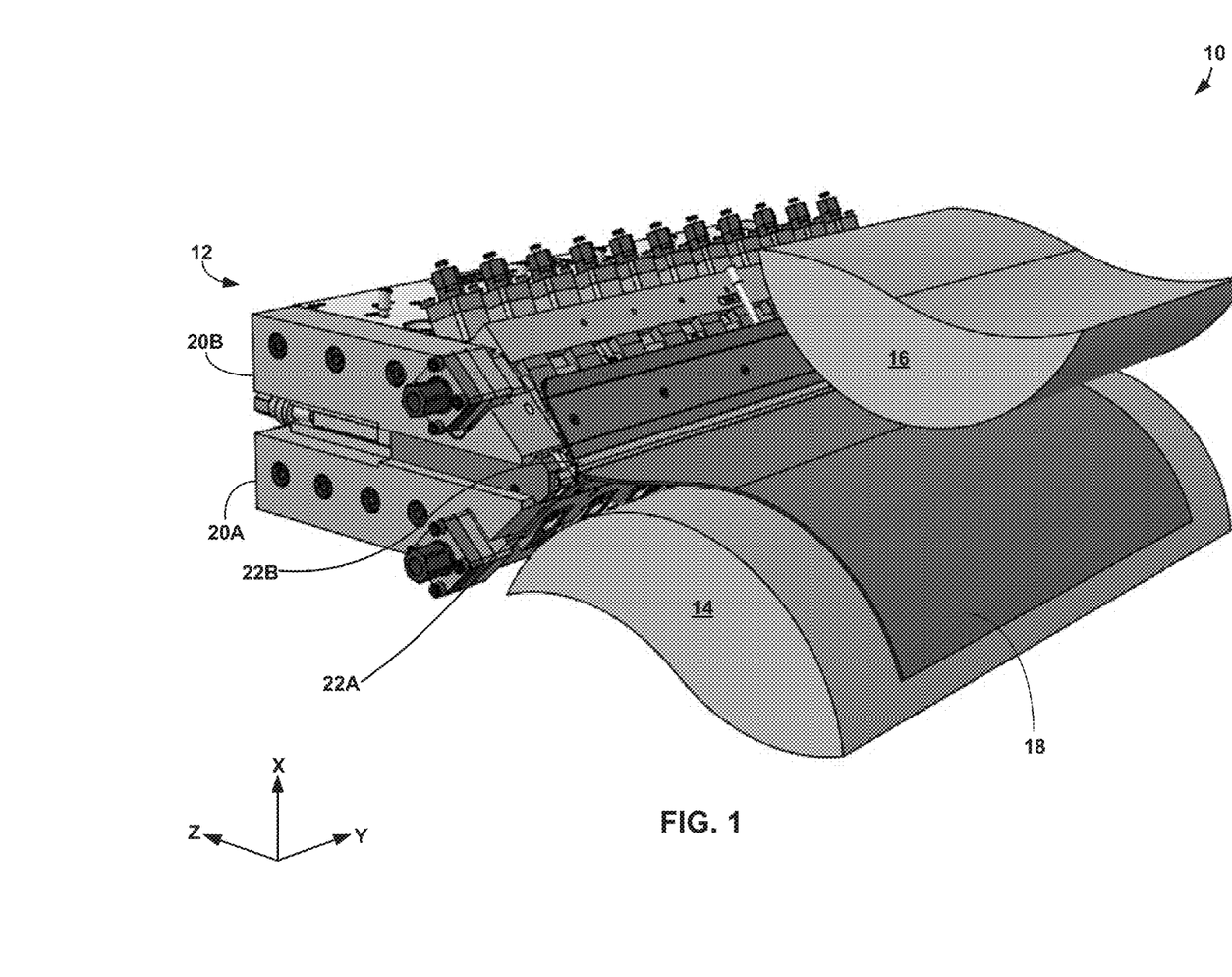
FIG. 1 is a perspective illustration of an example system, including an example extrusion die, that may be used to manufacture a thin sheet extrudate.

FIG. 1 is a perspective illustration of a system 10 that includes an extrusion die 12 and a calender formed of cooperating rollers 14 and 16. Extrusion die receives molten thermoplastic material, for example from an upstream feed block not illustrated, and extrudes the thermoplastic material into a sheet 18. As described in greater detail below, extrusion die 12 has an adjustable length land channel and can also have adjustable die lips to adjust the lip gap spacing through which sheet 18 exits.

Extrusion die 12 is formed of a first die body portion 20A carrying a first lip body 22A and a second die body portion 20B carrying a second lip body 22B. A flow channel is formed between first die body portion 20A and second die body portion 20B. The flow channel is a pathway along which molten polymer travels through the extrusion die. The flow channel extends from an inlet on the upstream side of the die (in the direction of polymer flow travel) to an outlet orifice on the downstream side of the die. Sheet 18 discharges through the outlet orifice and is calendered between cooperating rollers 14 and 16, which define a nip therebetween. In other configurations of system 10, sheet 18 can be discharged onto a single roller 14 without being calendered or may not be discharged onto a discharge roller at all.

Extrusion die 12 can process any desired types of thermoplastic materials to form sheet 18. Example polymeric materials that may be extruded using extrusion die 12 include, but are not limited to, polyethylene (e.g., high-density, low-density, linear low-density), polypropylene, polyvinyl chloride, polystyrene, polyethylene terephthalate, ethylene vinyl alcohol, polyvinyl alcohol, polyvinylidene chloride, polyamides, polycarbonates, cellulosics, and combinations thereof. In addition, in some applications, two or more different types of thermoplastic material are fed to the inlet of the extrusion die to produce a multilayer sheet 18. The resulting multilayer film is composed of multiple individual layers stacked one on top of another and adhered together, with at least one individual layer having a different composition than at least one other individual layer in the film.

Figure 2:
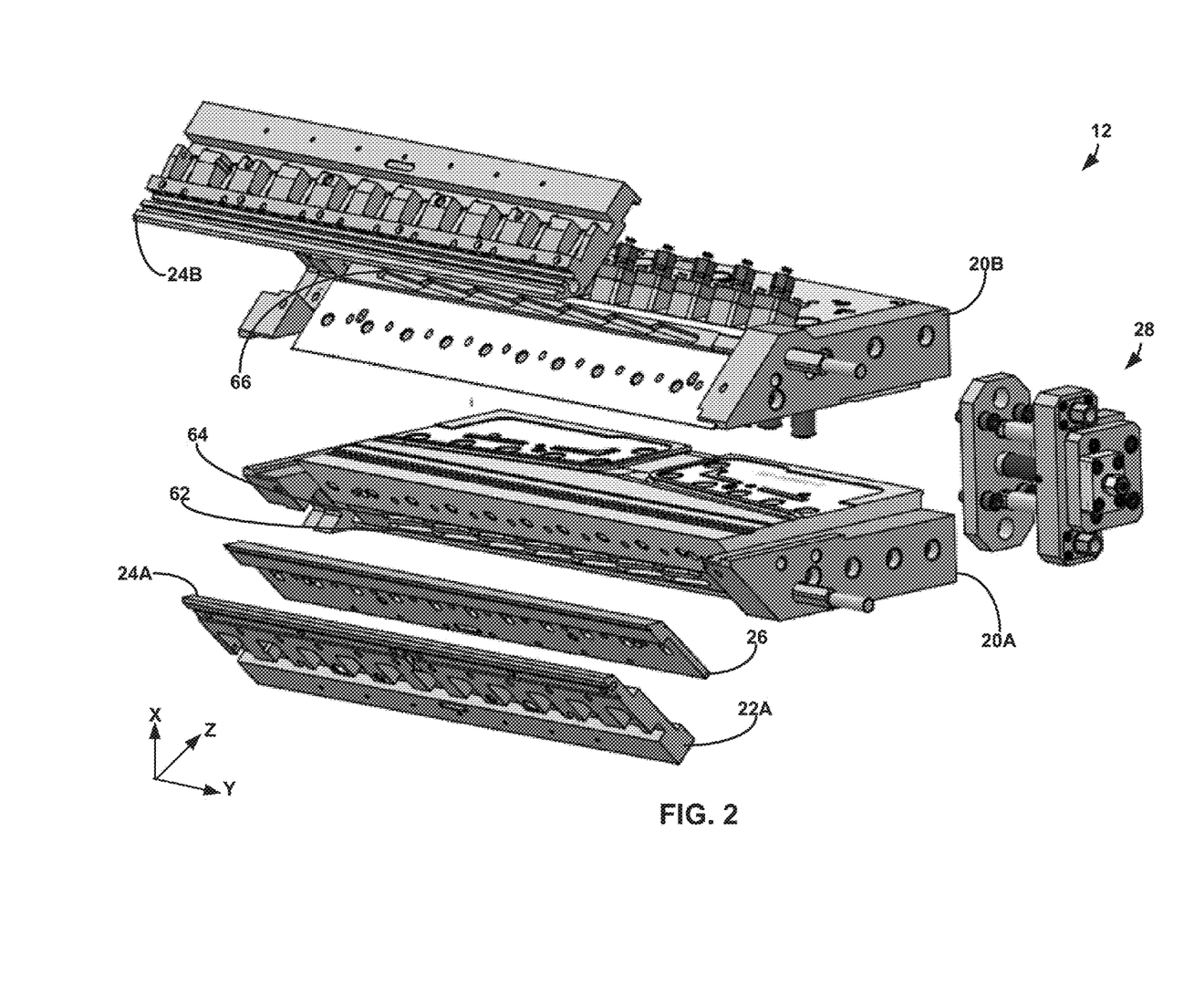
FIG. 2 is an exploded perspective view of the example extrusion die of FIG. 1.

FIG. 2 is an exploded perspective view of an example configuration of extrusion die 12 that is used in system 10 of FIG. 1. The different components of extrusion die 12 are illustrated as being separated from but connectable to each other so as to provide a bounded flow path through which molten polymer moves from an inlet to an outlet orifice. Extrusion die 12 includes first die body portion 20A and second die body portion 20B (collectively forming a die body 20). Extrusion die 12 also includes first lip body 22A and second lip body 22B. First lip body 22A is connectable to first die body portion 20A to provide a first die lip 24A bounding one side of the outlet orifice of the extrusion die. Second lip body 22B is connectable to second die body portion 20B to provide a second die lip 24B bounding an opposite side of the outlet orifice of the extrusion die.

Extrusion die 12 in FIG. 2 also includes at least one land channel body 26, which is illustrated as a single land channel body. Land channel body 26 is positioned between first die body portion 20A and first lip body 22A. Land channel body 26 forms a portion of an internal wall surface of extrusion die 12 that bounds the flow path of molten polymer through the die. As described in greater detail below, land channel body 26 is movable relative to first die body portion 20A, for example, in the positive and negative X-direction indicated on FIG. 2. Movement of land channel body 26 can adjust the length of the land channel portion of the flow channel extending through the extrusion die.

To control movement of land channel body 26, extrusion die 12 also includes an adjustment mechanism 28. Adjustment mechanism 28 is operatively connected to land channel body 26 (FIGS. 4 and 5A) and, in the illustrated example, is also operatively connected to first lip body 22A and second lip body 22B. Adjustment mechanism 28 can be engaged to increase or decrease the width of the outlet orifice between first lip body 22A and second lip body 22B. Adjustment mechanism 28 moves first lip body 22A and second lip body 22B in opposing directions to increase or decrease the width of the outlet orifice. This is useful control with thickness of the sheet produced using extrusion die 12. Adjustment mechanism 28 also moves land channel body 26. Movement of land channel body 26, alone or in combination with movement of first lip body 22A and second lip body 22B, adjusts the length of the land channel in extrusion die 12. This helps ensure that the length of the land channel is appropriate (for example, provides the appropriate amount of backpressure) for the particular outlet orifice width selected.

Figure 3A:
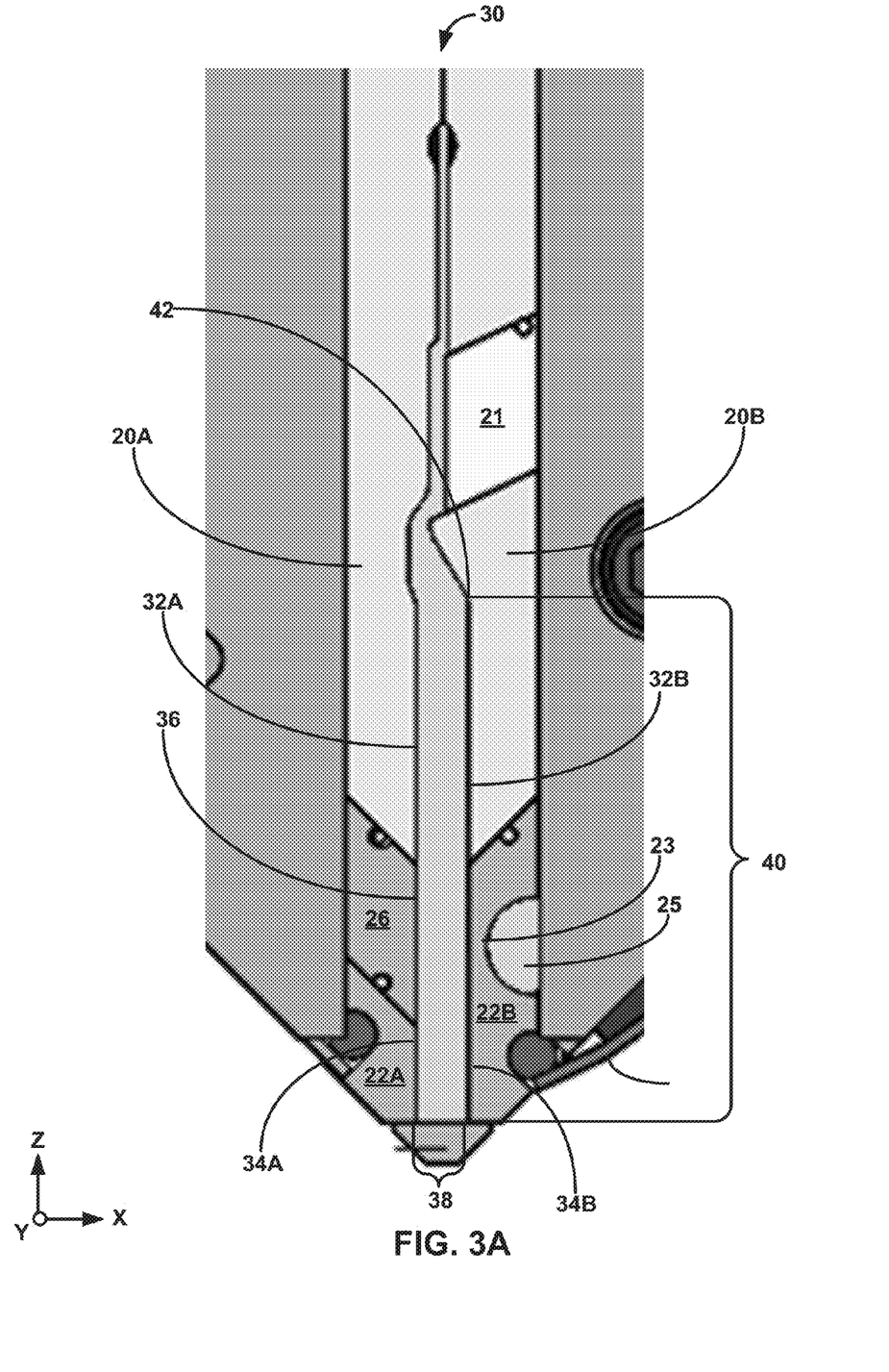
FIGS. 3A-3D are side view drawings illustrating example flow channel configurations that may be created using the example extrusion die of FIG. 1.

FIGS. 3A-3D are side view drawings illustrating different flow channel configurations near the die exit that can be established using extrusion die 12. Like reference numerals in FIGS. 3A-3D refer to like components. With reference to FIG. 3A, extrusion die 12 includes first die body portion 20A and second die body portion 20B having a flow channel 30 therebetween. First die body portion 20A has a first flow channel face 32A. Second die body portion 20B has a second flow channel face 32B. First flow channel face 32A and second flow channel face 32B are the surfaces of the die body portions facing flow channel 30 and bounding the flow channel. In operation, molten polymer flows through flow channel 30 adjacent to and in contact with first flow channel face 32A and second flow channel face 32B.

In different embodiments, first die body portion 20A and second die body portion 20B can form a coat hanger-type die manifold, a "T"-type die manifold, a fishtail die manifold, a variation of a coat hanger-type die manifold, or yet further die manifold design. Independent of the specific type of manifold formed by die body 20, flow channel 30 can be in fluid communication with, and extend to or through, the manifold. In the illustrated configuration of FIG. 3A, die body 20 includes a restrictor or chocker bar 21 that can move into and out of flow channel 30 upstream of the land channel. This can adjust polymer flow through the die body upstream of the land channel. In other embodiments, extrusion die 12 does not include a restrictor bar.

Extrusion die 12 also includes first lip body 22A, second lip body 22B, and land channel body 26. First lip body 22A has a first lip face 34A. Second lip body 22B has a second lip face 34B. Land channel body 26 has a land channel face 36. Land channel face 36 is positioned between first flow channel face 32A and first lip face 34A. First lip face 34A, second lip face 34B, and land channel face 36 provide surfaces downstream of first flow channel face 32A and second flow channel face 32B that face flow channel 30 and bound the flow channel. When polymer is flowing through flow channel 30, the polymer can flow adjacent to and in contact with first lip face 34A, second lip face 34B, and land channel face 36.

First lip body 22A is illustrated as having an inflexible lip body while second lip body 22B is illustrated as being a flexible lip body. The flexible lip body includes a hinge 23, which is defined in part by a recess 25. Hinge 23 allows movement of the flexible lip body relative to second die body portion 20B. A biasing member 27 can push against the cantilevered end of the flexible lip body to cause the lip to flex at hinge 23 (while the upstream end of the lip body does not flex). In other configurations, first lip body 22A may also be configured as a flexible lip body or second lip body 22B may be configured as an inflexible lip body.

First lip body 22A and second lip body 22B form an outlet orifice 38 of flow channel 30 between the two bodies. Molten polymer is received at an inlet of flow channel 30, conveyed along the length of the flow channel (in the Z-direction indicated on FIG. 3A) through the extrusion die, and discharged from the extrusion die via outlet orifice 38. Flow channel 30 is bounded on side (in the X-direction indicated on FIG. 3A) by first flow channel face 32A, land channel face 36, and first lip face 34A. Flow channel 30 is bounded on an opposite side by second flow channel face 32B and second lip face 34B. Flow channel 30 bounded in that the different surfaces delimit the cavity inside of extrusion die 12 forming the flow channel.

Flow channel 30 includes a land channel 40 which, as will be described, has a variable length (in the Z-direction indicated on FIG. 3A). Land channel 40 is the portion of the flow channel extending upstream from outlet orifice 38 (in the direction of polymer flow) immediately adjacent the outlet orifice. Land channel 40 may be distinguished from a reminder of flow channel 30 in that it is the section of constant cross-sectional width (in the X-direction indicated in FIG. 3A) leading up to outlet orifice 38. For example, land channel 40 may be the portion of the flow channel extending from outlet orifice 38 to an upstream location 42 where the width of the flow channel changes. In FIG. 3A, the width of the remainder of flow channel 30 is illustrated as narrowing relative to land channel 40 at upstream location 42. In other situations (e.g., FIG. 3B), the width of the remainder of flow channel 30 expands relative to land channel 40 at upstream location 42. Land channel 40 may be referred to as a final land channel in instances where an upstream section of flow channel 30 is referred to as pre-land channel.

Land channel 40 has a length extending in the direction of polymer travel through extrusion die 12 (in the Z-direction indicated on FIG. 3A). The backpressure of molten polymer flowing through extrusion die 12 at outlet orifice 38 is dictated, at least in part, by the length of land channel 40. Configuring extrusion die 12 with an adjustable length land channel 40 allows the backpressure at outlet orifice 38 to be controlled, for example, as the size of outlet orifice 38 is changed or other processing conditions are varied.

In the configuration of extrusion die 12, first lip body 22A and second lip body 22B are configured to move to adjust the size of outlet orifice 38, for example, to adjust the thickness of a sheet being produced on the extrusion die. first lip body 22A and second lip body 22B move in opposite directions to increase or decrease the width of outlet orifice 38. First lip body 22A moves in the X-direction indicated on FIG. 3A to decrease the width of outlet orifice 38 from one side while second lip body 22B moves in the negative X-direction indicated on FIG. 3A to decrease the width of the outlet orifice from the opposite side. In some configurations, first lip body 22A and second lip body 22B are configured to move equal distances so as to adjust the width of outlet orifice 38. Such a configuration can be useful to keep outlet orifice 38 substantially centered with a center of flow channel 30. In other configurations, first lip body 22A or second lip body 22B moves a greater distance than the other lip body to adjust the width of outlet orifice 38. This can offset the center of outlet orifice 38 after adjustment as compared to where the center of the outlet orifice was positioned before adjustment. In still other configurations, one or both of first lip body 22A and second lip body 22B may not be movable but may instead be fixed.

Land channel body 26 is configured to move relative to first die body portion 20A and/or first lip body 22A to adjust the length of land channel 40. Land channel body 26 moves selectively (by control of adjustment mechanism 28 in FIG. 1) towards and away from the opposed wall bounding flow channel 30 (in the X-direction indicated on FIG. 3A), thereby adjusting the width of the flow channel in the region of the land channel body. The length of land channel 40 is adjusted by changing the upstream location 42 where the width of flow channel 30 changes. As the upstream location 42 where the width of flow channel 30 changes shifts, the location delimiting the upstream extent of land channel 40 moves. This is perhaps best illustrated with reference to FIGS. 3B-3D.

In the position shown in FIG. 3A, first lip body 22A and second lip body 22B are fully retracted to provide a maximum cross-sectional width outlet orifice 38. In addition, land channel body 26 is retracted so that land channel 40 extends upstream of the land channel body. In particular, in the position of FIG. 3A, land channel body 26 is retracted so that land channel face 36 is flush with first flow channel face 32A and first lip face 34A. This positions the upstream location 42 where the width of flow channel 30 changes between first die body portion 20A and second die body portion 20B. As a result, land channel 40 has a length that extends along the first lip face 34A, along the land channel face 36, and along a portion of the first flow channel face 32A.

Figure 3B:
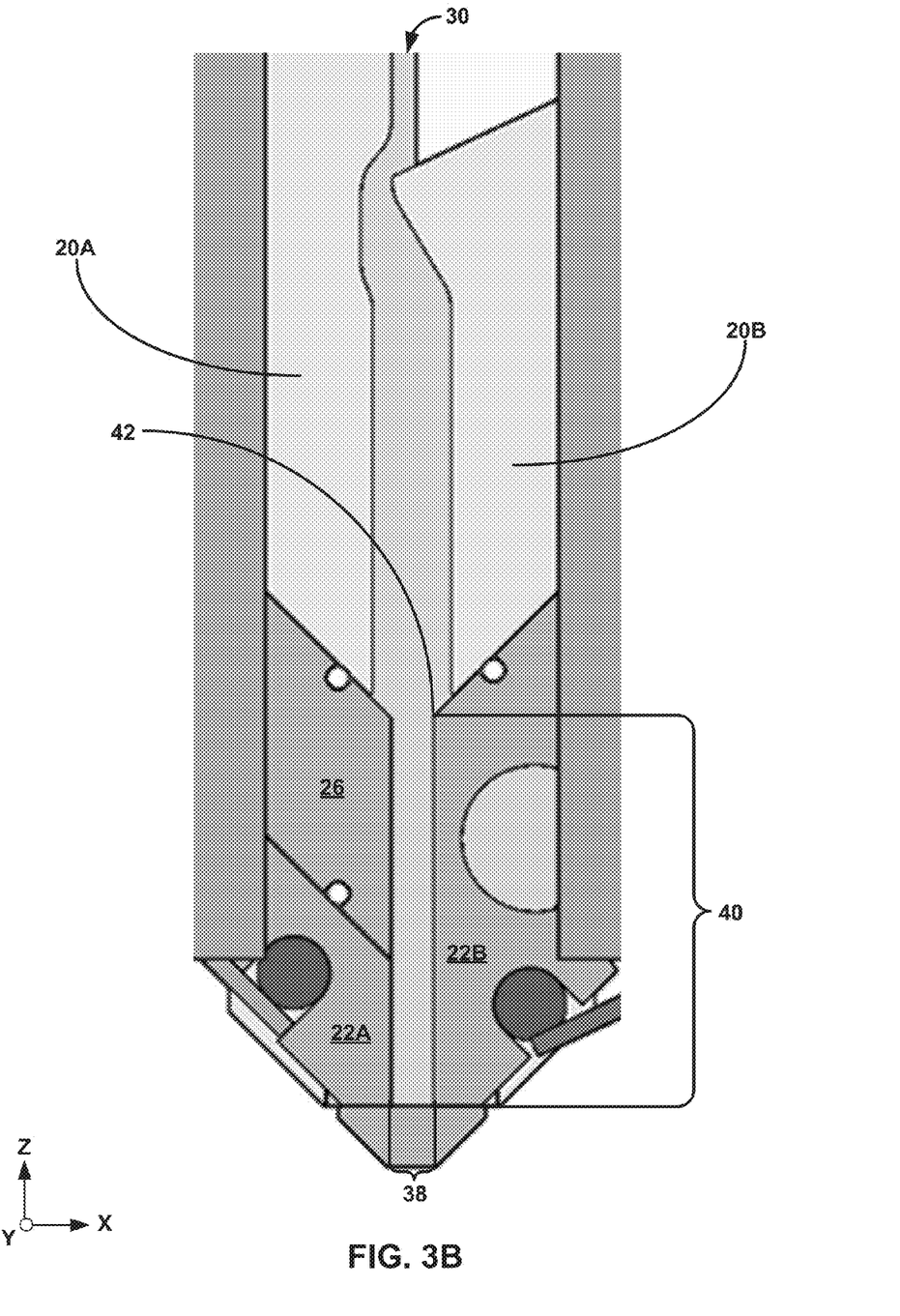

FIG. 3B illustrates an alternative position where first lip body 22A and second lip body 22B have been moved toward each other relative to the position shown in FIG. 3A to narrow the width of outlet orifice 38, for example to produce a sheet having a narrower thickness. In addition, land channel body 26 has been moved into flow channel 30 to change the length of land channel 40. In this position, first lip body 22A and land channel body 26 are advanced an equal distance into flow channel 30 relative to first die body portion 20A, which remains stationary. Second lip body 22B is advanced an equal distance into flow channel 30 from the opposite direction while second die body portion 20B remains stationary. In other configurations, second lip body 22B can be advanced a different distance into flow channel 30 or remain stationary.

When positioned as shown in FIG. 3B, first lip body 22A and land channel body 26 are advanced into flow channel 30 such that first lip face 34A is flush with land channel face 36. First lip face 34A and land channel face 36 are offset from first flow channel face 32A such that the upstream location 42 where the width of flow channel 30 changes is moved down to the upstream edge of land channel body 26. As a result, the length of land channel 40 is shortened such that the length extends along the first lip face 34A and along the land channel face 36 but not along first flow channel face 32A. In other words, by moving land channel body 26 into flow channel 30 in FIG. 3B, the length of land channel 40 is shortened so the land channel terminates at the upstream edge of the land channel body instead of extending upstream beyond the land channel body.

Figure 3C:
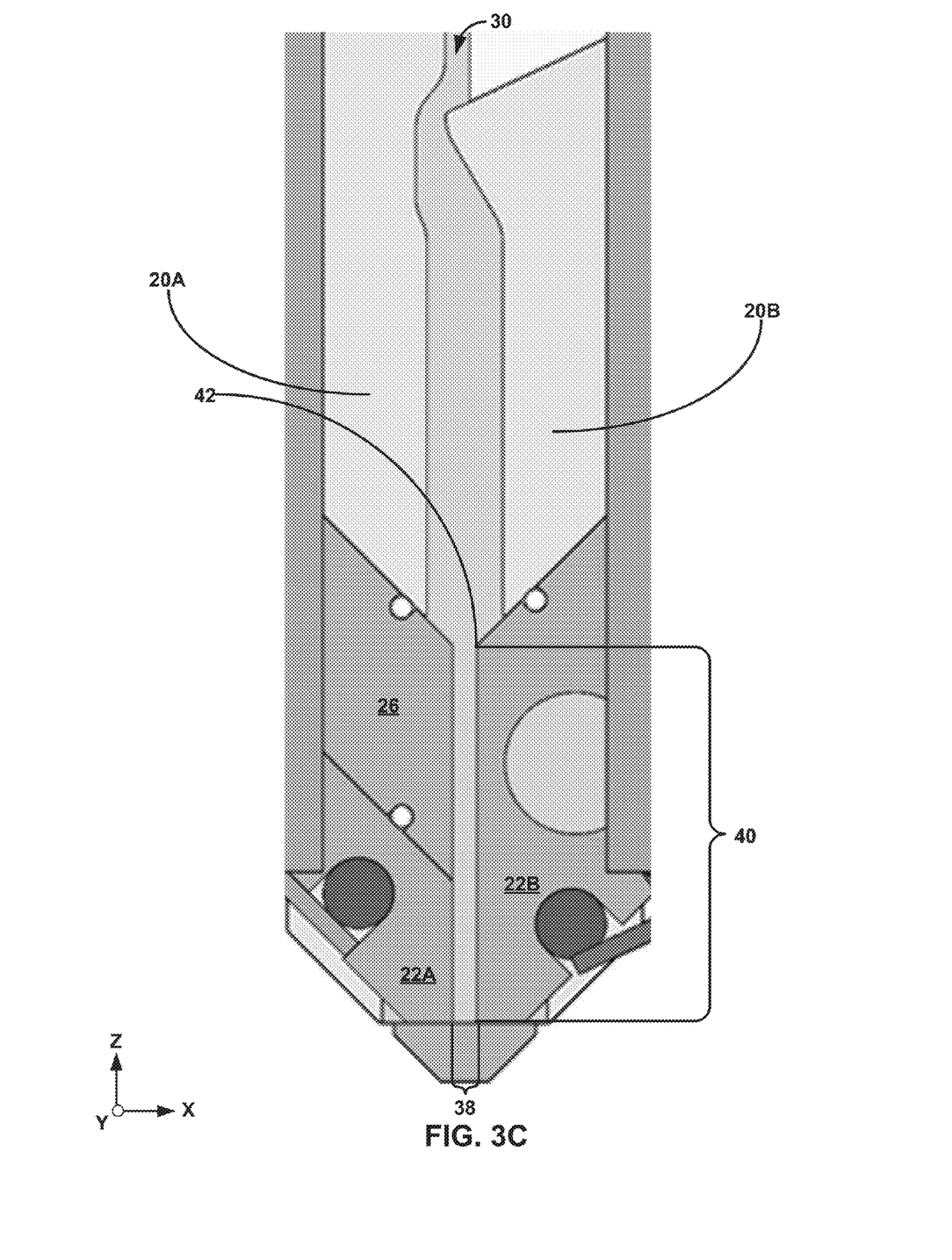

In some configurations, the width of outlet orifice 38 can also be adjusted (over a given range) without adjusting the length of land channel 40. In these configurations, first lip body 22A and land channel body 26 can be advanced into or retracted from flow channel 30 to adjust the width of outlet orifice 38 without changing the length of land channel 40. FIG. 3C illustrates such an alternative position. As shown in FIG. 3C, first lip body 22A and second lip body 22B are moved toward each other relative to the position shown in FIG. 3B to further narrow the width of outlet orifice 38. In addition, land channel body 26 is moved into flow channel 30 the same distance as first lip body 22A. Moving first lip body 22A and land channel body 26 an equal distance can adjust the width of outlet orifice 38 without changing the length of land channel 40. This may be useful were a particular land channel length provides suitable performance over a range of different outlet orifice widths.

Figure 3D:
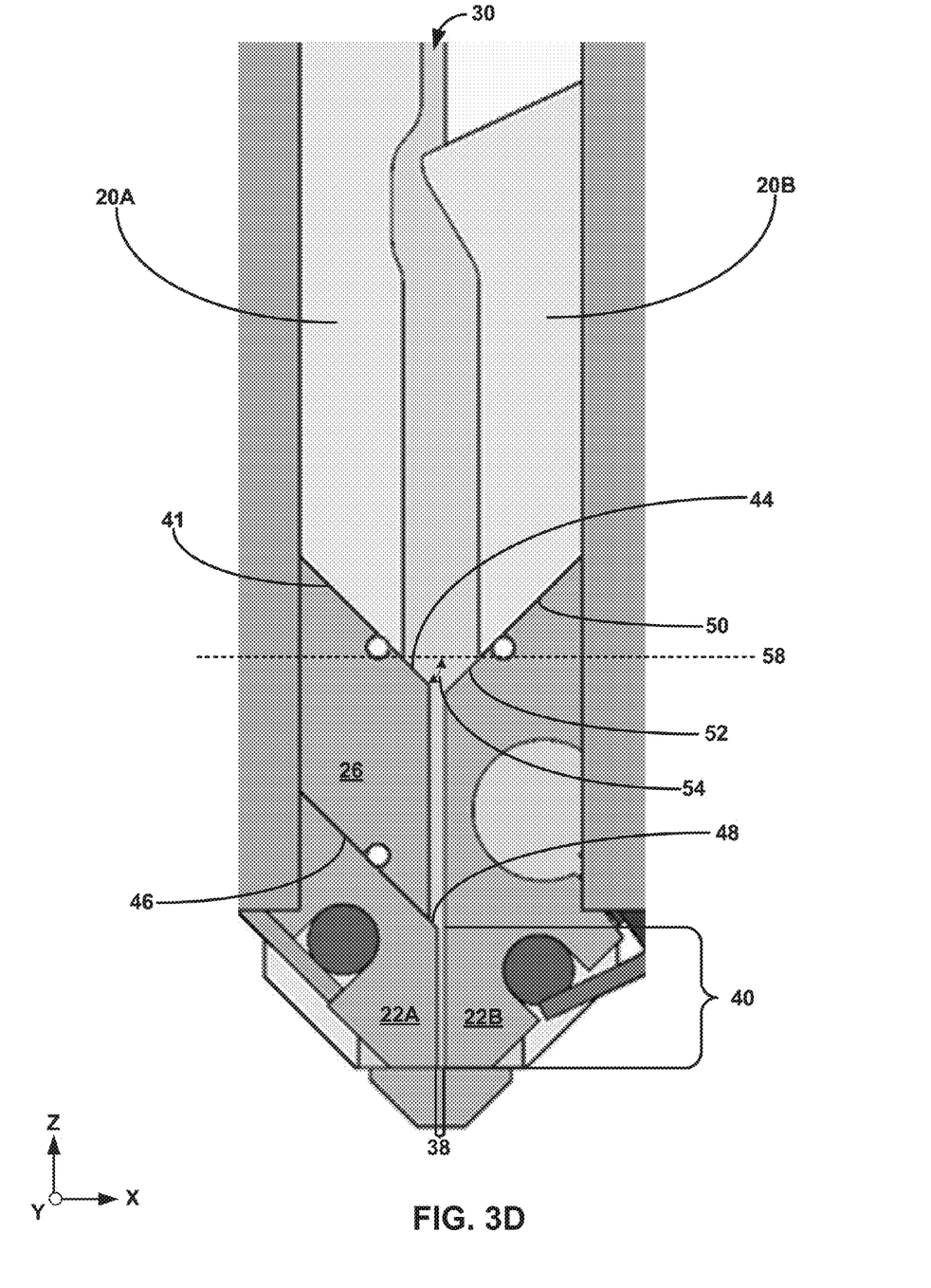

Depending on the configuration of extrusion die 12, first lip body 22A may or may not be configured to move farther into flow channel 30 than land channel body 26 so as to further narrow outlet orifice 38 and further adjust the length of land channel 40. FIG. 3D illustrates a configuration of extrusion die 12 where first lip body 22A is configured to move farther into flow channel 30 than land channel body 26.

As shown in FIG. 3D, first lip body 22A and second lip body 22B have been moved toward each other relative to the position shown in FIG. 3C to further narrow the width of outlet orifice 38, for example to produce a sheet having a narrower thickness. Land channel body 26 has remained stationary such that first lip body 22A is advanced into flow channel 30 a greater distance than land channel body 26.

When positioned as shown in FIG. 3D, land channel body 26 is advanced across the width of flow channel 30 a first distance, and first lip body 22A is advanced across the width of the flow channel a second distance greater than the first distance. Land channel face 36 is offset from first lip face 34A and first flow channel face 32. As a result, the length of land channel 40 is shortened such that the length extends along the first lip face 34A but not along land channel face 36 or first flow channel face 32A. In other words, by moving first lip body 22 into flow channel 30 a greater distance than land channel body 26 in FIG. 3D, the length of land channel 40 is shortened so the land channel terminates at the downstream edge of the land channel body instead of extending along the land channel body. In this manner, movement of land channel body 26 relative to first lip body 22A and/or first die body portion 20A adjusts the length of land channel 40. Although FIG. 3D illustrates land channel body 26 being offset from first die body portion 20A and first lip body 22A, in other applications, the land channel body may be retracted until land channel face 36 is flush with first flow channel face 32A.

The specific distances that first lip body 22A, second lip body 22B, and land channel body 26 are configured to move can vary, for example, based on the size of the extrusion die and the desired operating parameters of the die. In one example configuration, first lip body 22A and second lip body 22B are capable of moving to varying outlet orifice 38 between 0.02 inches and 0.4 inches. When outlet orifice 38 is set at the maximum opening (FIG. 3A), the length of land channel 40 is 4.0 inches. As first lip body 22A and second lip body 22B are advanced into flow channel 30, outlet orifice 38 narrows (FIG. 3B). Simultaneously, land channel body 26 advances into flow channel 30, reducing the length of land channel 40 to 1.875 inches. Further advancing first lip body 22A and second lip body 22B into flow channel 30 causes further narrowing of outlet orifice 38 (FIG. 3C). Land channel body continues advancing into flow channel 30 simultaneous with first lip body 22A, maintaining the length of land channel 40 at 1.875 inches. At an outlet orifice size of 0.15 inches, land channel body 26 stops moving while first lip body 22A and second lip body 22B continue advancing into flow channel 30 (FIG. 3D). This reduces the length of land channel 40 to 1.125 inches. Further advancing first lip body 22A and second lip body 22B into flow channel 30 causes further narrowing of outlet orifice 38 without changing the length of the land channel. The foregoing dimensions are merely examples, and it should be appreciated that the disclosure is not limited in this respect.

With further reference to FIG. 3A, the components of extrusion die 12 bounding flow channel 30 can have a variety of different configurations. In the illustrated configuration, first flow channel face 32A is parallel to second flow channel face 32B and located on an opposite side of flow channel 30 (in the X-direction on FIG. 3A) from the second flow channel face. In addition, first lip face 34A and land channel face 36 are parallel to second lip face 34B and located on an opposite side of flow channel 30 from the second lip face. Configuring opposed surfaces bounding flow channel 30 to be parallel to each allows flow channel 30 to have a constant cross-sectional width between opposed parallel surfaces.

In the configuration of FIGS. 3A-3D, extrusion die 12 has a single land channel body 26. In other configurations, extrusion die 12 can have more than one land channel body 26 (e.g., two, three, four, or more land channel bodies). The multiple land channel bodies can be arranged in series (e.g., a stacked arrangement) between first die body portion 20A and first lip body 22A. Each land channel can move different distances across the width of flow channel 30 as compared to each other land channel body.

Providing extrusion die 12 with multiple land channel bodies can be useful to provide additional land channel length control. As discussed above, the length of land channel 40 is varied by controlling the position of land channel body 26 relative to first die body portion 20A and first lip body 22A. Advancing land channel body 26 and first die body portion 20A away from first die body portion 20A and into flow channel 30 moves the upstream boundary of land channel 40, for example, to the upstream terminal edge of the land channel body. Further advancing first die body 20A away from land channel body 26 and into flow channel 30 moves the upstream boundary of land channel 40 to the downstream terminal edge of the land channel body. Thus, the length of land channel 40 changes by the length of land channel face 36, when the upstream boundary of the channel moves from the upstream edge of land channel body 26 to the downstream edge of the land channel body.

By adding additional land channel bodies that move different distances into flow channel 40, the length of land channel 40 can be shifted the length of each respective land channel body. In other words, as one land channel body moves farther into flow channel 30 relative to another stationary land channel body, the upstream boundary of land channel 40 shifts the length of the stationary land channel body. Incorporating additional land channel bodies into extrusion die 12 can provide finer control over the length adjustments made to the land channel.

In the embodiment illustrated in FIGS. 3A-3D, first lip body 22A and land channel body 26 move relative to first die body portion 20A to adjust the length of land channel 40. When land channel body 26 and first die body portion 20A are advanced an equal distance into flow channel 30 (FIG. 3B), polymer flowing through flow channel 30 contacts an upstream edge of land channel body 26 projecting into the flow channel. Likewise, when first die body portion 20A is advanced beyond land channel body 26 into flow channel 30, polymer flowing through flow channel 30 contacts an upstream edge of land channel body 26 projecting into the flow channel. To help prevent blocked flow on the upstream edges of first die body portion 20A and land channel body 26, the upstream edges are angled in the illustrated embodiment toward outlet orifice 38.

With reference to FIG. 3D, first die body portion 20A has a lower (downstream) edge face 41, land channel body 26 has an upper edge face 44 and lower edge face 46, and first lip body 22A has an upper edge face 48. In addition, second die body portion 20B has a lower edge face 50 and second lip body 22B has an upper edge face 52. The lower edge face 42 of the first die body portion 20A is in contact with the upper edge face 44 of the land channel body 26. The lower edge face 46 of the land channel body 26 is in contact with the upper edge face 48 of the first lip body 22A. In addition, the lower edge face 50 of the second die body portion 20B is in contact with the upper edge face 52 of the second lip body 22B.

In the illustrated configuration, the upper edge face 44 of land channel body 26, the upper edge face 48 of first lip body 22A, and the upper edge face 52 of second lip body 22B are all sloped downwardly (in the negative Z-direction indicted on FIG. 3D) toward outlet orifice 38. When so configured, polymer flowing in contact with the upper edge faces has a tendency to be directed toward outlet orifice 38 instead of accumulating on the edge faces. The upper edge faces are sloped at an angle 54 relative to an axis 56 normal to the length of flow channel 30. In various examples, angle 54 may be greater than 10 degrees, such as greater than 25 degrees, or from 25 degrees to 75 degrees. Further, the angle of each of upper edge face 44 of land channel body 26, upper edge face 48 of first lip body 22A, and upper edge face 52 of second lip body 22B may be the same or may be different.

As briefly discussed above with respect to FIG. 2, extrusion die 12 includes an adjustment mechanism 28. Adjustment mechanism 28 in the embodiment is operatively connected to first lip body 22A, second lip body 22B, and land channel body 26. Adjustment mechanism 28 can be engaged to move first lip body 22A and second lip body 22B relative to each other so as increase or decrease the width of outlet orifice 38 (FIGS. 3B-3D). In addition, engaging adjustment mechanism 28 causes land channel body 26 to move, thereby adjusting the length of land channel 40.

Figure 4:
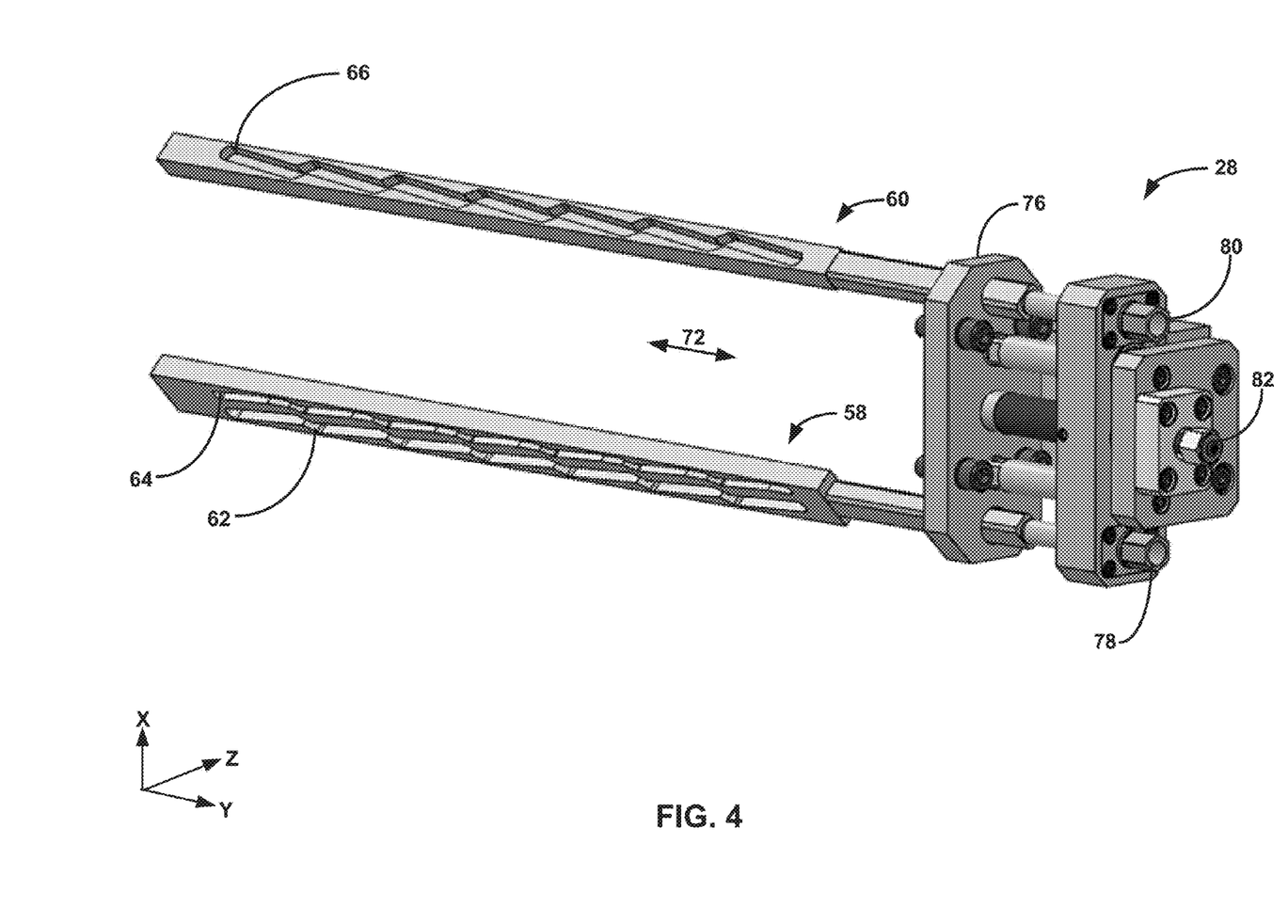
FIG. 4 is a perspective illustration of the adjustment mechanism from FIG. 2 shown removed from the extrusion die.

FIG. 4 is a perspective illustration of adjustment mechanism 28 from FIG. 2 shown removed from extrusion die 12 for purposes of illustration. As shown, adjustment mechanism 28 includes a first cam arm 58 and a second cam arm 60. First cam arm 58 has a first plurality of slots 62 and a second plurality of slots 64. Similarly, second cam arm 60 has a plurality of slots 66. To connect first lip body 22A, second lip body 22B, and land channel body 26 to adjustment mechanism 28, the die bodies and land channel body have a corresponding plurality of pins that are inserted into the slots carried by first cam arm 58 and second cam arm 60.

Figure 5A:
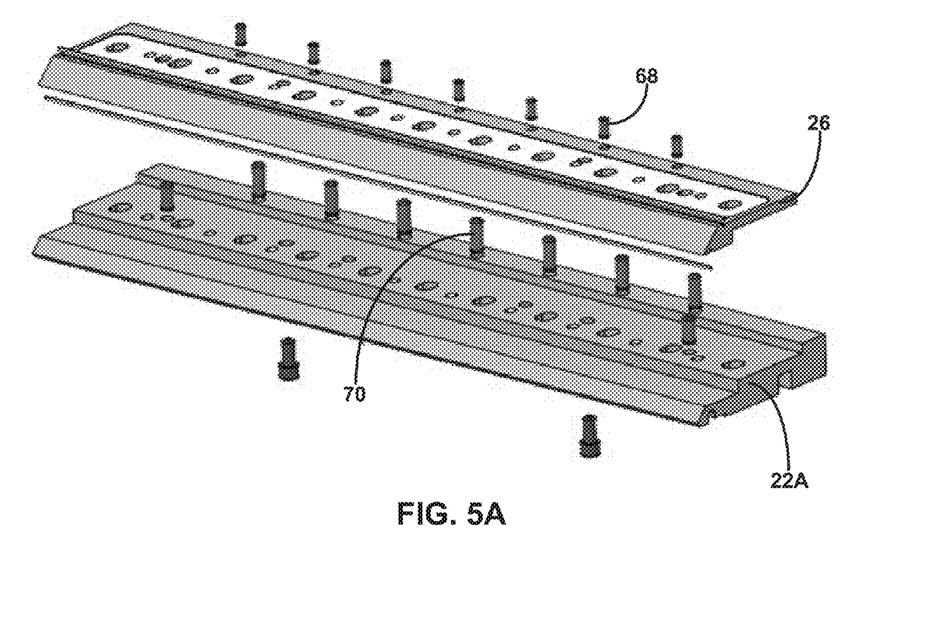
FIGS. 5A and 5B are illustrations of example movable extrusion die components.
Figure 5B:
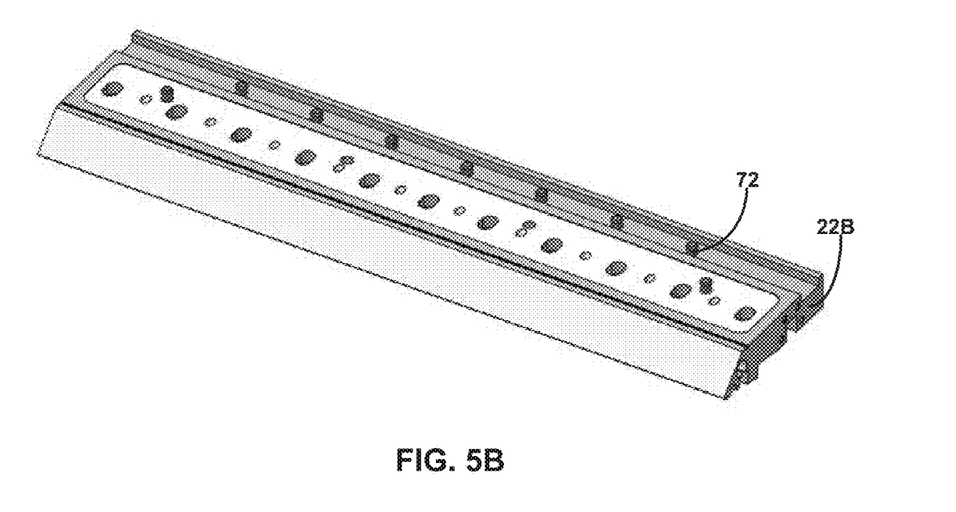

FIG. 5A is a perspective illustration of first lip body 22A and land channel body 26. FIG. 5B is a perspective illustration of second lip body 22B. As shown, land channel body 26 has a plurality of pins 68 configured to be inserted into the first plurality of slots 62 of first cam arm 58 (FIG. 4). First lip body 22A has a plurality of pins 70 configured to be inserted into the second plurality of slots 64 of first cam arm 58. Further, second lip body 22B has a plurality of pins 72 configured to be inserted into the plurality of slots 66 carried by second cam arm 60.

When the pins of first lip body 22A, second lip body 22B, and land channel body 26 are inserted into the corresponding slots of first cam arm 58 and second cam arm 60, a mechanical interconnection is established between the components. First cam arm 58 controls movement of first lip body 22A and land channel body 26 by translating relative to die body 20. Second cam arm 60 controls movement of second lip body 22B by also translating relative to die body 20.

For example, with further reference to FIG. 4, first cam arm 58 and second cam arm 60 are both configured to translate linearly in the direction indicated by arrow 74. As first cam arm 58 translates towards and away from base plate 76, the plurality of pins 68 carried by land channel body 26 translate in the first plurality of slots 62 (with the pins remaining stationary in the X-Y plane indicated on FIG. 4 as the slots move). Simultaneously, the plurality of pins 70 carried by first lip body 22A translate in the second plurality of slots 64 (with the pins again remaining stationary in the X-Y plane as the slots move). The first plurality of slots 62 and second plurality of slots 64 are configured (e.g., sized and/or shaped) to provide controlled movement of first lip body 22A and land channel body 26. For example, the depth of the slots (in the Z-direction indicated on FIG. 4) can be varied over their length (in the Y-direction indicated on FIG. 4). As the first cam arm 58 translates towards and away from base plate 76, the position of the plurality of pins 68 carried by land channel body 26 and the plurality of pins 70 carried by first lip body 22A moves in the Z-direction indicated on FIG. 4, depending on the depth of the corresponding slots at a given point of translation. In turn, this causes first lip body 22A and land channel body 26 to move in the X-direction indicated on FIGS. 2 and 3A-3D. In this way, first cam arm 58 transforms linear motion in the Y-direction shown on FIG. 4 into movement in the X-direction indicated on FIGS. 3A-3D.

Second cam arm 60 also translates towards and away from base plate 76. As second cam arm 60 moves, the plurality of pins 72 carried by second lip body 22B translate in the plurality of slots 66 (with the pins remaining stationary in the X-Y plane indicated on FIG. 4 as the slots move). Again, the depth of the slots (in the Z-direction indicated on FIG. 4) can be varied over their length (in the Y-direction indicated on FIG. 4). As second cam arm 60 translates, the position of the plurality of pins 72 carried by second lip body 22B moves depending on the depth of the corresponding slots at a given point of translation. In turn, this causes second lip body 22B to move in the X-direction indicated on FIGS. 2 and 3A-3D.

To control first cam arm 58 and second cam arm 60, die adjustment mechanism 28 in FIG. 4 includes an adjuster. In particular, in the embodiment of FIG. 4, adjustment mechanism 28 includes three adjusters: a first adjuster 78, a second adjuster 80, and a third adjuster 82. The adjusters are illustrated as nuts that can be turned, causing rotary motion of the nuts to translate into linear motion of first cam arm 58 and/or second cam arm 60.

First adjuster 78 is operatively connected to first cam arm 58. Turning first adjuster 78 one direction causes first cam arm 58 to advance out of die body 20 (FIG. 2), and turning the adjuster the opposite direction causes the cam arm to retract into the die body in the opposite direction. Second adjuster 80 is operatively connected to second cam arm 60. Turning second adjuster 80 one direction causes second cam arm 60 to advance out of die body 20 (FIG. 2), and turning the adjuster the opposite direction causes the cam arm to retract into the die body in the opposite direction. Third adjuster 82 is operatively connected to both first cam arm 58 and second cam arm 60. Turning third adjuster 82 one direction causes both first cam arm 58 and second cam arm 60 to advance out of die body 20, and turning the adjuster the opposite direction causes both cam arms to retract into the die body in the opposite direction.

When configured as illustrated in FIG. 4, first adjuster 78 and second adjuster 80 can be used to move first cam arm 58 and second cam arm 60 independently of each other. For example, first adjuster 78 can be used to translate first cam arm 58, thereby simultaneously moving first lip body 22A and land channel body 26. Second adjuster 80 can be used to separately translate second cam arm 60, thereby moving second lip body 22B. Such an arrangement can be useful when first setting up extrusion die 12 or otherwise making calibration adjustments to the die.

Third adjuster 82 simultaneously moves first cam arm 58 and second cam arm 60, thereby simultaneously moving first lip body 22A, second lip body 22B, and land channel body 26. This provides a single adjustment control for simultaneously adjusting the width of outlet orifice 38 and also adjusting the length of land channel 40. This can allow rapid, on-line adjustments to the width of the outlet orifice and the length of the land channel (e.g., while polymer is flowing through the extrusion die).

In configurations where adjustment mechanism 28 simultaneously moves first cam arm 58 and second cam arm 60 to simultaneously move first lip body 22A, second lip body 22B, and land channel body 26, the adjustment mechanism may, but need not, move first lip body 22A, second lip body 22B, and land channel body 26 the same distance and/or at the same rate. For example, the shape and/or depth of the slots carried by first cam arm 58 and second cam arm 60 may be controlled so that first lip body 22A, second lip body 22B, and/or land channel body 26 move at different rates and/or different distances relative to each other.

In some configurations, adjustment mechanism 28 moves first lip body 22A and/or second lip body 22B and/or land channel body 26 to one of a plurality of discrete positions by translating first cam arm 58 and second cam arm 60. In other configurations, adjustment mechanism 28 moves first lip body 22A and/or second lip body 22B and/or land channel body 26 through a continuous range of different positions by translating first cam arm 58 and second cam arm 60. The movement behavior of first lip body 22A, second lip body 22B and/or land channel body 26 can be controlled by controlling the shape and/or depth of the slots carried by first cam arm 58 and second cam arm 60.

While FIGS. 4 and 5A-5B shown one example configuration of adjustment mechanism 28, other configurations are possible, and the disclosure is not limited in this respect. In general, any feature coupled (e.g., mechanically, electrically) to first lip body 22A, second lip body 22B and/or land channel body 26 and capable of providing mechanical force to move the bodies can be used as adjustment mechanism. Further, while adjustment mechanism 28 is coupled to each of first lip body 22A, second lip body 22B, and land channel body 26 to move each of the bodies together, in other configurations, first lip body 22A, second lip body 22B, and/or land channel body 26 can be connected to separate adjustment mechanisms. For example, instead of designing first cam arm 58 to have first plurality of slots 62 and second plurality of slots 64, separate cam arms (e.g., independently controllable) can be provided to carry each set of slots. As another example, in configurations where second lip body 22B does not move, adjustment mechanism 28 can be configured without second cam arm 60.

Various examples have been described. These and other examples are within the scope of the following claims.

The invention claimed is:

1. An extrusion die, comprising:
    a die body including a first die body portion having a first flow channel face and a second die body portion having a second flow channel face,
    a first lip body,
    a second lip body,
    at least one land channel body,
    an adjustment mechanism, and
    a flow channel that includes a land channel terminating in an outlet orifice,
    said first lip body being connected to said first die body portion and having a first lip face and said second lip body being connected to said second die body portion and having a second lip face, said first lip body and said second lip body forming the outlet orifice therebetween;
    said at least one land channel body having a land channel face positioned between said first flow channel face and said first lip face;
    the flow channel being bounded on one side by at least said first flow channel face, said land channel face, and said first lip face and on an opposite side by at least said second flow channel face and said second lip face;
    said at least one land channel body being movable to adjust a length of the land channel; and
    said adjustment mechanism being operatively connected to the at least one land channel body by a cam arm, and also being operatively connected to the first lip body and the second lip body to increase or decrease the width of the outlet orifice between the first lip body and the second lip body, such that the first lip body is operatively connected to the adjustment mechanism by the cam arm, and wherein said adjustment mechanism is configured to control movement of said at least one land channel body to adjust the length of said land channel.

2. The extrusion die of claim 1, wherein the flow channel has a width, the land channel is a portion of the flow channel extending from the outlet orifice to a location where the width of the flow channel changes, said at least one land channel body is configured to move selectively towards or away from said opposite side bounding the flow channel to adjust the width of the flow channel, and the length of the land channel is adjusted as the location where the width of the flow channel changes moves.

3. The extrusion die of claim 1, wherein at least one of said first lip body and said second lip body is movable to adjust a width of the outlet orifice.

4. The extrusion die of claim 3, wherein said land channel body is configured to move to at least three positions, including:
    a first position in which said land channel face is flush with said first flow channel face and said first lip face such that the length of the land channel extends along said first flow channel face, said land channel face, and said first lip face;
    a second position in which said land channel face is flush with said first lip face, but said first lip face and said land channel face are offset from said first flow channel face, such that the length of the land channel extends along said land channel face and said first lip face but not said first flow channel face; and
    a third position in which said land channel face is offset from said first lip face and said first flow channel face such that the length of the land channel extends along said first lip face but not said land channel face and said first flow channel face.

5. The extrusion die of claim 3, wherein both of said first lip body and said second lip body are movable to adjust the width of the outlet orifice, said first lip body and said second lip body being configured to move equal distances but in opposite directions when adjusting the width of the outlet orifice.

6. The extrusion die of claim 5, wherein said at least one land channel body is configured to move simultaneously with said first lip body and said second lip body.

7. The extrusion die of claim 5, wherein said first flow channel face is parallel to and opposite said second flow channel face, said first lip face is parallel to and opposite said second lip face, and said land channel face is parallel to and opposite said second lip face such that said land channel face and said first lip face have a combined length equal to a length of said second lip face.

8. The extrusion die of claim 1, wherein
    said first die body portion has a lower edge face, said land channel body has an upper edge face and a lower edge face, and said first lip body has an upper edge face;
    said lower edge face of said first die body portion is in contact with said upper edge face of said land channel body and said lower edge face of said land channel body is in contact with said upper edge face of said first lip body; and
    said upper edge face of said land channel body and said upper edge face of said first lip body are sloped downwardly toward the outlet orifice.

9. The extrusion die of claim 1,
wherein said cam arm has a plurality of slots, said at least one land channel body has a plurality of pins, and said plurality of pins of said at least one land channel body are inserted into said plurality of slots of said cam arm, and
wherein said adjustment mechanism is configured to advance said cam arm out of said die body or retract said cam arm into said die body, thereby causing said plurality of pins to translate in said plurality of slots.

10. The extrusion die of claim 9, wherein said first lip body is movable to adjust a width of said outlet orifice, said first lip body has a plurality of pins, said plurality of slots comprises a first plurality of slots and further comprising a second plurality of slots, and said plurality of pins of said first lip body are inserted into said second plurality of slots of said cam arm.

11. The extrusion die of claim 10, wherein said second lip body is also movable to adjust the width of said outlet orifice, said second lip body has a plurality of pins, said cam arm comprises a first cam arm and said adjustment mechanism further comprises a second cam arm having a plurality of slots, and said plurality of pins of said second lip body are inserted into said plurality of slots of said second cam arm.

12. The extrusion die of claim 11, wherein said adjustment mechanism further comprises a first adjuster, a second adjuster, and a third adjuster;
said first adjuster being operatively connected to said first cam arm and configured to advance said first cam arm out of said die body or retract said first cam arm into said die body, thereby simultaneously moving said first lip body and said at least one land channel body;
said second adjuster being operatively connected to said second cam arm and configured to advance said second cam arm out of said die body or retract said second cam arm into said die body, thereby moving said second lip body; and
said third adjuster being operatively connected to said first cam arm and said second cam arm and configured to simultaneously advance said first and second cam arms out of said die body or retract said first and second cam arms into said die body, thereby simultaneously moving said first lip body, said second lip body, and said at least one land channel body.

13. The extrusion die of claim 1, wherein said at least one land channel body is movable in an oblique direction relative to an axial direction of the flow channel to adjust the length of the land channel.

14. An extrusion die, comprising:
a die body including a first die body portion having a first flow channel face and a second die body portion having a second flow channel face,
a first lip body,
a second lip body,
at least one land channel body, and
a flow channel that includes a land channel terminating in an outlet orifice,
said first lip body being connected to said first die body portion and having a first lip face and said second lip body being connected to said second die body portion and having a second lip face, said first lip body and said second lip body forming the outlet orifice therebetween;
said at least one land channel body having a land channel face positioned between said first flow channel face and said first lip face;
the flow channel being bounded on one side by at least said first flow channel face, said land channel face, and said first lip face and on an opposite side by at least said second flow channel face and said second lip face;
said at least one land channel body being movable to adjust a length of the land channel;
said first die body portion having a lower edge face, said land channel body having an upper edge face and a lower edge face, and said first lip body having an upper edge face;
said lower edge face of said first die body portion is in contact with said upper edge face of said land channel body and said lower edge face of said land channel body is in contact with said upper edge face of said first lip body; and
said upper edge face of said land channel body and said upper edge face of said first lip body are sloped downwardly toward the outlet orifice.

15. An extrusion die, comprising:
a die body including a first die body portion having a first flow channel face and a second die body portion having a second flow channel face,
a first lip body,
a second lip body,
at least one land channel body,
a flow channel that includes a land channel terminating in an outlet orifice, and
an adjustment mechanism operatively coupled to said at least one land channel body,
said first lip body being connected to said first die body portion and having a first lip face and said second lip body being connected to said second die body portion and having a second lip face, said first lip body and said second lip body forming the outlet orifice therebetween;
said at least one land channel body having a land channel face positioned between said first flow channel face and said first lip face;
the flow channel being bounded on one side by at least said first flow channel face, said land channel face, and said first lip face and on an opposite side by at least said second flow channel face and said second lip face;
said at least one land channel body being movable to adjust a length of the land channel;
said adjust mechanism being configured to control movement of said at least one land channel body to adjust the length of said land channel;
said adjustment mechanism including a cam arm having a plurality of slots, said at least one land channel body has a plurality of pins, and said plurality of pins of said at least one land channel body are inserted into said plurality of slots of said cam arm; and
said adjustment mechanism being configured to advance said cam arm out of said die body or retract said cam arm into said die body, thereby causing said plurality of pins to translate in said plurality of slots.

16. The extrusion die of claim 15, wherein said first lip body is movable to adjust a width of said outlet orifice, said first lip body has a plurality of pins, said plurality of slots comprises a first plurality of slots and further comprising a second plurality of slots, and said plurality of pins of said first lip body are inserted into said second plurality of slots of said cam arm.

17. The extrusion die of claim 16, wherein said second lip body is also movable to adjust the width of said outlet orifice, said second lip body has a plurality of pins, said cam arm comprises a first cam arm and said adjustment mechanism further comprises a second cam arm having a plurality of slots, and said plurality of pins of said second lip body are inserted into said plurality of slots of said second cam arm.

18. The extrusion die of claim 17, wherein said adjustment mechanism further comprises a first adjuster, a second adjuster, and a third adjuster;
  said first adjuster being operatively connected to said first cam arm and configured to advance said first cam arm out of said die body or retract said first cam arm into said die body, thereby simultaneously moving said first lip body and said at least one land channel body;
  said second adjuster being operatively connected to said second cam arm and configured to advance said second cam arm out of said die body or retract said second cam arm into said die body, thereby moving said second lip body; and
  said third adjuster being operatively connected to said first cam arm and said second cam arm and configured to simultaneously advance said first and second cam arms out of said die body or retract said first and second cam arms into said die body, thereby simultaneously moving said first lip body, said second lip body, and said at least one land channel body.

* * * * *